United States Patent [19]

Rossman

[11] 4,266,707
[45] May 12, 1981

[54] BOAT SEAT TACKLE BOX

[76] Inventor: Dale W. Rossman, 223 Ninth St., LaSalle, Ill. 61301

[21] Appl. No.: 78,642

[22] Filed: Sep. 24, 1979

[51] Int. Cl.³ .......................... B60N 1/10; B63B 29/00
[52] U.S. Cl. .......................................... 224/275; 9/7;
297/193; 312/235 R
[58] Field of Search ............... 224/275, 901; 9/7, 1.1,
9/1.7; 43/54.5 R, 55; 297/188, 192, 193;
312/235 R

[56] References Cited
U.S. PATENT DOCUMENTS

| 2,264,744 | 12/1941 | Osnnam | 297/192 X |
|---|---|---|---|
| 2,551,431 | 5/1951 | Field | 43/55 X |
| 2,812,227 | 11/1957 | Hill | 312/235 R |
| 3,338,629 | 8/1967 | Drees | 312/235 R |
| 3,789,444 | 2/1974 | McCord | 9/7 |
| 3,800,939 | 4/1974 | Cornelius | 224/901 |
| 4,146,279 | 3/1979 | Stahel | 312/235 R |
| 4,191,420 | 3/1980 | Fassett et al. | 297/192 X |

FOREIGN PATENT DOCUMENTS 643300 6/1962 Canada .................. 43/54.5 R 766934 1/1957 United Kingdom ............. 312/235 R

OTHER PUBLICATIONS

*Popular Mechanics*, Jun. 1939, p. 909.

Primary Examiner—Stephen Marcus
Attorney, Agent, or Firm—Mason, Kolehmainen, Rathburn & Wyss

[57] ABSTRACT

A tackle box adapted for mounting in a working position on a boat seat of the type extending laterally between opposite sides of the boat. The tackle box includes a bottom wall adapted to rest on an upper surface of the seat and includes a pair of depending ribs for keying the tackle box on the seat against substantial fore and aft relative movement. The tackle box also includes a peripheral sidewall extending upwardly of the bottom wall forming one or more tackle holding compartments and a top wall mounted for pivotal movement with respect to the sidewall between an open position wherein access to the interior of the compartments is provided and a closed position for covering the compartments and providing a seating surface for the boat.

9 Claims, 3 Drawing Figures

U.S. Patent  May 12, 1981  4,266,707
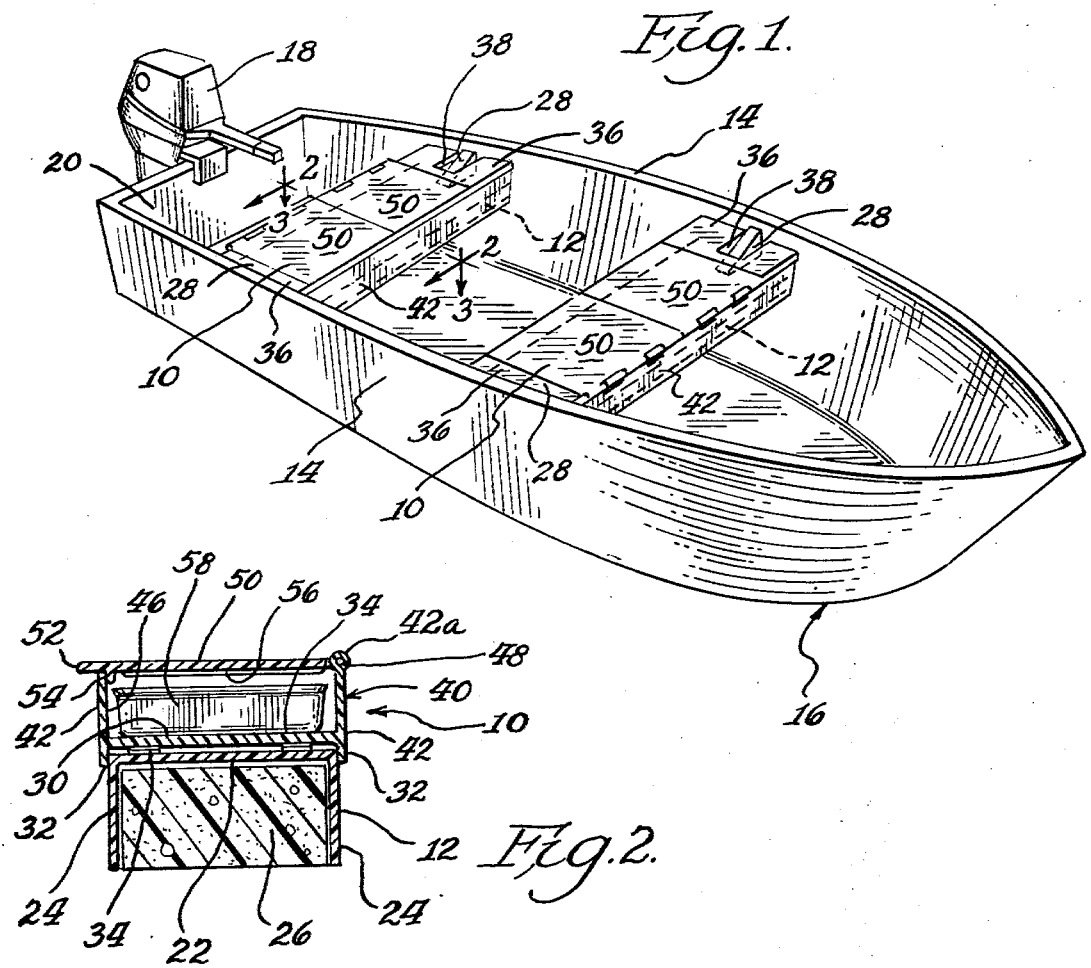
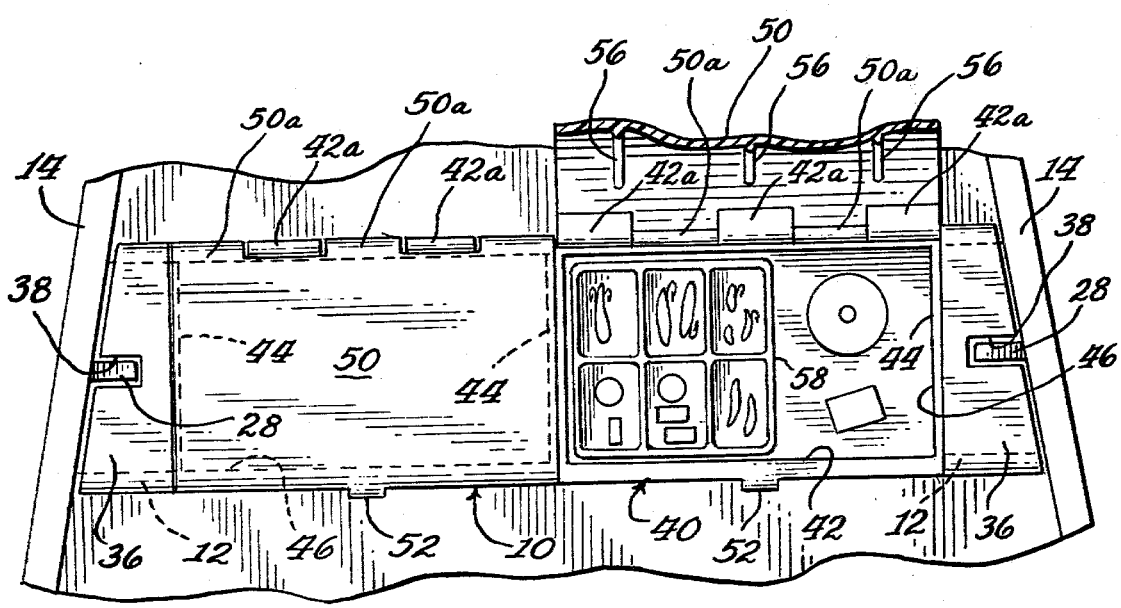

BOAT SEAT TACKLE BOX

BACKGROUND OF THE INVENTION

1. Field of the Invention

The present invention relates to fishing tackle boxes and more particularly, relates to a fishing tackle box especially adapted to be mounted on a boat in a working position so that when the box is closed, a lid or top serves as a seating surface for the boat.

2. Description of the Prior Art

A wide variety of tackle boxes have been provided and over the years a number of tackle boxes and/or storage compartments have been especially adapted for use on various types of watercraft such as boats and canoes. U.S. Pat. Nos. 2,203,565; 2,316,833; 2,473,874; 2,846,806; 3,775,895; 3,716,938; 3,824,733; 3,947,991; 3,958,289 and 4,020,986 are representative of some of the prior art endeavors in this field.

OBJECTS OF THE PRESENT INVENTION

It is an object of the present invention to provide a new and improved tackle box and more particularly a new and improved fishing tackle box especially adapted for mounting in a working position on a boat seat.

It is another object of the present invention to provide a new and improved tackle box for mounting on a boat seat and removably attachable thereto in a manner whereby the tackle box will not readily become dislodged or detached from the seat even though the boat may undergo rapid and/or violent movements at times.

Still another object of the present invention is to provide a new and improved tackle box of the character described which is key fitted to the structure of the boat so that the position of the tackle box is relatively secure and the contents thereof relatively safe from spillage even though the tackle box may be subjected to a wide range and direction of different forces tending to dislodge the box from a desired position.

Still another object of the present invention is to provide a new and improved tackle box of the character described which includes a hinged top wall or lid that provides a seating surface for occupants of the boat when the tackle box is closed.

Still another object of the present invention is to provide a new and improved tackle box of the character described which is provided with a segmented top wall or lid structure designed to cover a pair of individually separate compartments so that one top wall segment may serve as a seat surface while the other top wall is opened up for use and vice versa.

Yet another object of the present invention is to provide a new and improved tackle box of the character described which is economical to construct, simple to use, neat in appearance and one which lends itself readily to mass production in an injection molding process.

SUMMARY OF THE INVENTION

The foregoing objects and advantages of the present invention are accomplished in an illustrated embodiment comprising a new and improved tackle box especially adapted for mounting in a working position on a boat seat of the type extending laterally between opposite sides of the boat. The tackle box includes a bottom wall adapted to rest on an upper surface of the seat and is provided with a pair of depending ribs along forward and aft edges disposed adjacent respective fore and aft side edges of the boat seat to key or secure the box in position on the seat against substantial fore and aft relative movement with respect thereto. A peripheral sidewall extends upwardly of the bottom wall to form one or more tackle holding compartments and a hinged top wall or lid is provided for each compartment and is mounted for pivotal movement with respect to the sidewall between an open position and a closed position. When opened, direct access to the interior of a compartment is provided and when the lid or top wall is closed over the top of a compartment the top wall or lid provides a seating surface for the boat.

BRIEF DESCRIPTION OF THE DRAWINGS

For a better understanding of the present invention, reference should be had to the following detailed description taken in conjunction with the drawings, in which:

FIG. 1 is a perspective view of a typical fishing boat employing a pair of new and improved boat seat tackle boxes constructed in accordance with the features of the present invention;

FIG. 2 is a fragmentary vertical cross-sectional view taken substantially along lines 2—2 of FIG. 1; and FIG. 3 is a top plan view of the tackle box looking in the direction of arrows 3—3 of FIG. 1.

DESCRIPTION OF THE PREFERRED EMBODIMENT

Referring now more particularly to the drawings, therein is illustrated a new and improved boat seat, tackle box constructed in accordance with the features of the present invention and referred to generally by the reference numeral 10. The tackle boxes 10 are especially adapted to be mounted on the seats 12 of a boat 16 wherein the seats are of the type extending transversely between opposite sides 14 of the hull as in a typical fishing boat of fibreglass, wood or aluminum. Fishing boats of this type are often powered by an outboard engine 18 or other suitable power source such as a trolling motor mounted on a transom 20 at the aft end of the boat.

As shown in FIG. 2, a typically constructed transverse boat seat includes an upper wall or seating surface 22 and a pair of fore and aft depending skirts or sidewalls 24 which form a channel-shaped cross-section. In customary fashion, under seat, water flotation is provided by a large block of light weight foam 26 beneath the top wall or seating surface between the edge flanges of the laterally extending boat seat. The boat seat structure 12 is normally attached at opposite ends to the sidewalls 14 of the boat and typically, triangular shape strengthening gussets 28 are provided to extend upwardly of the seating surface 22 to tie the seat structurally with the sidewalls 14.

In accordance with the present invention, each tackle box 10 is designed to substantially cover the entire seating surface 22 of a transverse boat seat 12 and a tackle box may be used for each seat in the boat. A tackle box includes a bottom wall 30 having a pair of downwardly depending, integrally formed ribs 32 along fore and aft edges adapted to provide a keyed interfitting relationship between the bottom portion of the tackle box and the upper portion of the boat seat as shown in FIG. 2.

The depending ribs 32 are adapted to closely confront or engage the respective fore and aft, upper edge portions of the skirts 24 and this engagement prevents any substantial relative movement in a fore and aft direction between the tackle box and the supporting seat structure.

In order to secure the tackle box 10 against relative movement away from the seat surface 22, there is provided a suitable number of "Velchro" type fasteners 34 at appropriate spacing intervals and these fasteners detachably secure the undersurface of the tackle box bottom wall 30 onto the upper surface of the boat seat surface 22. The resulting keyed and interlocked arrangement and fastener system positively secures the tackle box 10 against both fore and aft movement as well as vertical movement relative to the supporting boat seat 12. However, when desired, the tackle box can be easily removed from the boat without requiring the use of tools or other implements by simply exerting sufficient upward pressure on the depending lips or ribs 32 adjacent the bottom wall of the tackle box structure.

In addition to the keyed interfitting relationship as described, relative lateral displacement of the tackle box 20 on the boat seat 12 is precluded by a pair of generally trapezoidal shaped stop elements 36 formed at opposite ends of the tackle box. These stop elements comprise planar wall segments and each is formed with a slot or recess 38 along an outer edge for accommodating a gusset 28 thereby providing further insurance against dislodgment of the tackle box from the boat seat.

In accordance with the present invention, the boat seat tackle box 10 includes an integrally formed upstanding peripheral sidewall structure 40 having fore and aft transversely extending spaced apart sidewalls 42 substantially coincident with the depending ribs 32. In addition, a plurality of sidewalls 44 are joined to the walls 42 and these relatively short walls form and divide the tackle box into one or more individual tackle holding compartments 46, as best shown in FIG. 3.

At least one of the fore and aft lateral sidewalls is formed with integral hinge structures 42a for accommodating an elongated hinge pin 48 used for pivotally attaching one or more lids or top walls 50 for the tackle box. The lids serve as a seating surface for the boat when closed as well as tightly enclosing the storage compartments to prevent spillage of the tackle and preventing any water from entering into the tackle box compartment. As illustrated, the top walls or lids 50 are also provided with integrally formed hinge portions 50a in coaxial alignment with the hinge portions 42a to accommodate the supporting hinge pins 48 so that the top walls or lids may be freely pivoted between open and closed positions as desired. To facilitate opening, each lid is provided with a knob or handle 52 on an edge opposite the hinged edge and a dependent, sealant ridge 54 inset slightly from the outer edge of the lid is adapted to engage and seal against the inside surface of a lateral sidewall 42 to provide a tight enclosure and secure the lid in a closed position. This close fitting arrangement normally prevents the lids from pivoting upwardly inadvertently should the boat encounter rough water or the like.

Preferably, the top walls or lids 50 are formed of integrally molded plastic material of a type such as polycarbonate resin having sufficient strength to provide ample support for a person sitting on the closed tackle box on the boat seat. If required for additional strength, integral ribs 56 may be provided on the underside of the hinged lids. As illustrated, each tackle box 10 usually includes at least a pair of separate tackle storage compartments 46 and a separate lid for each compartment so that a person may sit on one of the lids when it is closed with the other lid adjacent thereto being open to provide access to the fishing tackle in the adjacent compartment. In boats of larger beam, a tackle box having three or even four compartments may be provided if desired and each tackle containing compartment 46 may be provided with a removable tackle tray 58 having many smaller tray dividers therein as illustrated in FIG. 3. Preferably, the tackle box structure is formed of integrally molded, light in weight, but strong, resinous, plastic material which is well suitable for the marine environment. The planar stop elements 36 at opposite ends of the tackle box are formed with a flat upper surface which is substantially level with the upper surfaces of the lids 50 when they are in a closed position and thus a smooth seating surface extends all the way across the beam of the boat above the seats 12 at a level several inches above the level of the upper seat surface 22. The tackle boxes provide a neat, uncluttered look for a boat plus convenient storage for readily accessible fishing tackle. The design insures against an open tackle box or the like being knocked off a seat or the contents being spilled in times of excitement such as when catching a fish or encountering rough water or the like. The tackle boxes 10 serve a dual function in providing both a tackle storage compartment as well as a seating surface for the boat. Any fisherman who has had the contents of his tackle box spilled out into the bottom of the boat will most likely appreciate greatly, the novel tackle box 10 of the present invention.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A tackle box adapted for mounting in a working position on a boat seat of the type extending between opposite sides of said boat; said tackle box including
    a bottom wall adapted to rest on an upper surface of said seat and including a pair of depending ribs along forward and aft edges thereof disposed adjacent respective fore and aft side edges of said seat to key said box on said seat against substantial fore and aft relative movement with respect thereto,
    a peripheral side wall extending upwardly of said bottom wall forming a tackle holding compartment,
    a top wall for said compartment mounted for pivotal movement with respect to said sidewall between an open position for providing access to the interior of said compartment and a closed position over said compartment providing a seating surface for said boat, and
    lateral stop means engageable with opposite sides of said boat for preventing substantial relative movement between said tackle box and said seat in a direction laterally of said boat.

2. The tackle box of claim 1 in combination with fastener means for securing said bottom wall to said seat against relative upward movement with respect thereto.

3. The tackle box combination of claim 2 wherein said fastener means includes at least one "Velchro" fastener combination disposed between a lower surface of said bottom wall and said upper surface of said seat.

4. The tackle box of claim 1 wherein said lateral stop means is formed with an upper surface substantially coextensive with an upper surface of said top wall in a closed position for providing additional seating surface area for said boat.

5. The tackle box of claim 4 wherein said lateral stop means includes a pair of stop elements on opposite sides of said compartment engageable with adjacent sides of said boat.

6. The tackle box of claim 1 wherein said lateral stop means includes surfaces engageable with said sides of said boat for limiting fore and aft relative movement between said tackle box and said boat.

7. The tackle box of claim 1 wherein said sidewall defines wall portions of a pair of said compartments and including a divider wall between said compartment extending fore and aft of said boat, said top wall including a pair of seat elements mounted for pivotal movement independently of one another.

8. The tackle box of claim 7 wherein said seat elements are mounted for pivotal movement on a common axis extending laterally of said boat between opposite sides.

9. The tackle box of claim 1 including in combination, a tackle tray removably mounted in said compartment.

* * * * *